United States Patent
Lee et al.

(10) Patent No.: US 12,343,923 B2
(45) Date of Patent: Jul. 1, 2025

(54) APPARATUS FOR MANUFACTURING POUCH-TYPE BATTERY CASE

(71) Applicant: LG Energy Solution, Ltd., Seoul (KR)

(72) Inventors: Jung Eok Lee, Daejeon (KR); Gee Hwan Kim, Daejeon (KR); Ho Young Park, Daejeon (KR); Dae Kyu Kwak, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 365 days.

(21) Appl. No.: 17/939,321

(22) Filed: Sep. 7, 2022

(65) Prior Publication Data
US 2023/0090480 A1    Mar. 23, 2023

(30) Foreign Application Priority Data
Jul. 16, 2021 (KR) .................. 10-2021-0093792

(51) Int. Cl.
*B29C 51/14* (2006.01)
*B29C 51/08* (2006.01)
*B29C 51/26* (2006.01)
*B29L 31/00* (2006.01)

(52) U.S. Cl.
CPC .............. *B29C 51/14* (2013.01); *B29C 51/08* (2013.01); *B29C 51/266* (2013.01); *B29L 2031/7146* (2013.01)

(58) Field of Classification Search
CPC ....... B29C 51/266; B29C 51/08; B29C 51/14; B29C 51/262; B29C 51/261; Y02E 60/10; B29L 2031/7146
See application file for complete search history.

(56) References Cited

U.S. PATENT DOCUMENTS

| 6,656,232 B1 | 12/2003 | Usui et al. |
| 2019/0207172 A1 | 7/2019 | Kim et al. |
| 2021/0005920 A1 | 1/2021 | Omori et al. |

FOREIGN PATENT DOCUMENTS

| JP | 3652597 B2 | 5/2005 |
| JP | 3661439 B2 | 6/2005 |
| JP | 5589591 B2 | 9/2014 |
| JP | WO2019188725 A1 | 3/2021 |
| KR | 20080007696 A | 1/2008 |
| KR | 20120058198 A | 6/2012 |
| KR | 20140132528 A | 11/2014 |
| KR | 20140147372 A | 12/2014 |
| KR | 20180106523 A | 10/2018 |

(Continued)

*Primary Examiner* — Monica A Huson
(74) *Attorney, Agent, or Firm* — Lerner David LLP

(57) ABSTRACT

An apparatus for manufacturing a pouch-type battery case according to an embodiment may be configured to mold a pouch sheet. The apparatus for manufacturing the pouch-type battery case may include a forming device configured to mold a cup part in the pouch sheet, a first roller disposed behind the forming device in a moving direction of the pouch sheet and rotating in contact with one surface of the pouch sheet, and a second roller disposed to face the first roller with the pouch sheet therebetween and rotating in contact with the other surface opposite to the one surface of the pouch sheet. Any one of the first roller and the second roller may have an outer diameter that gradually decreases inward in a thickness direction, and the other one of the first roller and the second roller may have an outer diameter that gradually increases inward in the thickness direction.

16 Claims, 7 Drawing Sheets

(56) References Cited

FOREIGN PATENT DOCUMENTS

| | | | |
|---|---|---|---|
| KR | 102150010 | B1 | 8/2020 |
| KR | 102224911 | B1 | 3/2021 |
| KR | 102246095 | B1 | 4/2021 |
| KR | 102261672 | B1 | 6/2021 |

APPARATUS FOR MANUFACTURING POUCH-TYPE BATTERY CASE

CROSS-REFERENCE TO RELATED APPLICATIONS

This application claims the priority of Korean Patent Application No. 10-2021-0093792 filed on Jul. 16, 2021, in the Korean Intellectual Property Office, the disclosure of which is incorporated herein by reference.

BACKGROUND OF THE INVENTION

Field of the Invention

The present invention relates to an apparatus for manufacturing a pouch-type battery case, and more particularly, to an apparatus for manufacturing a pouch-type battery case in which a cup part is molded.

Description of the Related Art

In general, a process of manufacturing a pouch-type battery case include a process of forming a cup part at regular intervals, a process of cutting a pouch sheet at regular intervals to form a pouch case including the cup part, a process of accommodating an electrode assembly in the cup part of the pouch case, and a process of folding the pouch case to seal the cup part in which the electrode assembly is accommodated.

In particular, the process of forming the cup part in the pouch sheet is performed by a forming device including a die and a punch. However, when the cup part is formed in the pouch sheet, concentration of residual stress or a center of gravity in one direction occurs to cause curling in a region disposed at each of both sides of the cup part in the pouch sheet or a phenomenon in which the region is curled toward the cup part.

PRIOR ART DOCUMENT

Patent Document

KR 10-2018-0106523 A (Published on Oct. 1, 2018)

SUMMARY OF THE INVENTION

An aspect of the present invention provides an apparatus for manufacturing a pouch-type battery case, in which pushing of a pouch sheet, in which a cup part is formed, is minimized to prevent curling from occurring.

According to an aspect of the present invention, there is provided an apparatus for manufacturing a pouch-type battery case, which is capable of molding a pouch sheet. The apparatus for manufacturing the pouch-type battery case may include: a forming device configured to mold a cup part in the pouch sheet, a first roller disposed behind the forming device in a moving direction of the pouch sheet and rotating in contact with one surface of the pouch sheet; and a second roller disposed to face the first roller with the pouch sheet therebetween and rotating in contact with the other surface opposite to the one surface of the pouch sheet. Any one of the first roller and the second roller may have an outer diameter that gradually decreases inward in a thickness direction, and the other one of the first roller and the roller may have an outer diameter that gradually increases inward in the thickness direction.

The first roller may be provided in a pair that rotate in contact with both sides of the one surface of the pouch sheet in the width direction.

The second roller may be provided in a pair that rotate in contact with both sides of the other surface of the pouch sheet in the width direction.

A distance between the forming device and a rotation shaft of the first roller may be different from a distance between the forming device and a rotation shaft of the second roller in the moving direction of the pouch sheet.

An outer circumference of the first roller and an outer circumference of the second roller may have shapes corresponding to each other.

The first roller and the second roller may be disposed at a predetermined angle therebetween in the moving direction of the pouch sheet.

The apparatus may further include: a shaft extending in parallel to the width direction of the pouch sheet and configured to connect the pair of first rollers to each other; and an angle adjustment frame disposed outside the pair of first rollers in the width direction of the pouch sheet and having a guide hole through which each of both ends of the shaft passes. The guide hole may have an arc shape having a center of curvature disposed on the rotation shaft of the second roller.

A plurality of restriction grooves disposed at each predetermined angle to restrict an end of the shaft in a longitudinal direction of the guide hole may be formed in an inner circumference of the guide hole.

A coupling part to which a fixing member configured to prevent the shaft from being separated from each of the restriction grooves is capable of being coupled may be formed on each of both ends of the shaft.

The apparatus may further include an elevation mechanism configured to support the angle adjustment frame at an upper side and elevate the angle adjustment frame.

The angle adjustment frame may include: a pair of side plates, each of which has the guide hole; and a connection frame which is spaced upward from the pouch sheet and configured to connect the pair of side plates to each other and to which the elevation mechanism is coupled.

The apparatus may further include: a first support frame configured to support the pair of second rollers; and a second support frame to which the elevation mechanism is coupled.

The second support frame may be supported by the first support frame.

The first support frame may include: a pair of first vertical frames spaced in parallel to the width direction of the pouch sheet; and a first horizontal frame supported by the pair of first vertical frames and configured to support the pair of second rollers. The second support frame may include: a pair of second vertical frames disposed outside the angle adjustment frame in the width direction of the pouch sheet; and a second horizontal frame which is supported by the pair of second vertical frames and on which the elevation mechanism is hung and supported.

A height adjustment part by which a height of the first horizontal frame with respect to the first vertical frames is adjustable may be provided on the first support frame.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
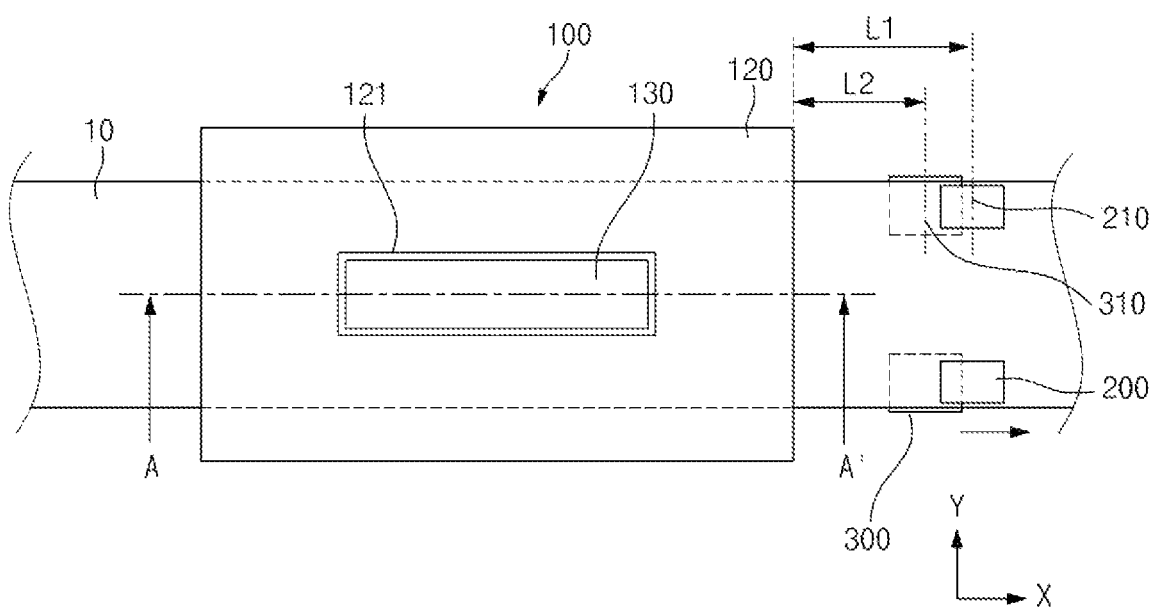
FIG. 1 is a plan view illustrating an apparatus for manufacturing a pouch-type battery case according to an embodiment of the present invention.

Hereinafter, preferred embodiments of the present invention will be described in detail with reference to the accompanying drawings so that those of ordinary skill in the art can easily carry out the present invention. However, the present invention may be implemented in several different forms and is not limited or restricted by the following examples.

In order to clearly explain the present invention, detailed descriptions of portions that are irrelevant to the description or related known technologies that may unnecessarily obscure the gist of the present invention have been omitted, and in the present specification, reference symbols are added to components in each drawing. In this case, the same or similar reference numerals are assigned to the same or similar elements throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

Figure 2:
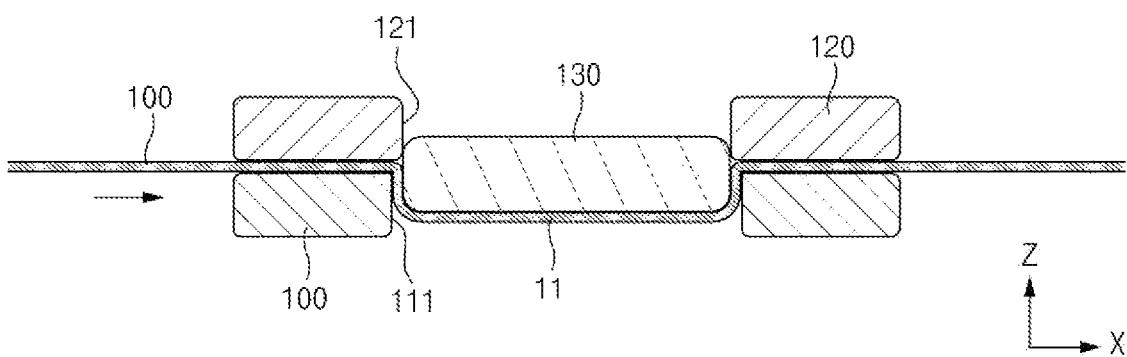
FIG. 2 is a cross-sectional view taken along line A-A' of FIG. 1.

FIG. 1 is a plan view illustrating an apparatus for manufacturing a pouch-type battery case according to an embodiment of the present invention, and FIG. 2 is a cross-sectional view taken along line A-A' of FIG. 1.

An apparatus for manufacturing a pouch-type battery case (hereinafter, 'manufacturing apparatus') according to an embodiment of the present invention may include a forming device 100 that molds a cup part 11 in a pouch sheet 10 and first and second rollers 200 and 300 that are disposed behind the forming device 100 in a moving direction of the pouch sheet 10.

The pouch sheet 10 may have a constant width and is movable in a longitudinal direction. The pouch sheet 10 may be a laminate sheet in which layers made of different materials are laminated. For example, the pouch sheet 10 may have a multi-layered structure in which a lower resin layer made of an insulating material such as polyethylene terephthalate (PET) or nylon, a metal layer made of an aluminum material that maintains mechanical strength and prevents moisture and oxygen from being penetrated, and an upper resin layer made of polyolefin-based material serving as a sealing material having thermal adhesiveness are laminated.

The forming device 100 may mold the cup part 11 in the pouch sheet 10. The cup part 11 may be molded by being recessed so that a portion of the pouch sheet 10 has a predetermined depth downward. An electrode assembly (not shown) may be accommodated in the cup part 11 in the future.

The cup part 11 may be formed to have a predetermined distance from each of both edges of the pouch sheet 10 in a width direction. The cup part 11 may be molded in a center of the pouch sheet 10 in the width direction, but is not limited thereto, and may be positioned asymmetrically to one side in the width direction of the pouch sheet 10.

The forming device 100 may mold a plurality of cup parts 11 at predetermined intervals along a moving direction of the pouch sheet 10. In more detail, the pouch sheet 10 may be repeated in movement and stop at a preset cycle, and the forming device 100 may mold the cup part 11 at a timing at which the pouch sheet 10 is stopped.

In more detail, the forming device 100 may include a die 110 disposed below the pouch sheet 10, and a stripper 120 and a punch 130, which are disposed above the pouch sheet 10.

The die 110 may have a plate shape, and a molding space 111 in which the cup part 11 is molded may be formed. The molding space 111 may be recessed or penetrated to a predetermined depth in a upper surface of the die 110.

The stripper 120 may have a plate shape and may fix the pouch sheet 10 together with the die 110. That is, the pouch sheet 10 may be fixed between the stripper 120 and the die 110.

The stripper 120 may surround a circumference of the punch 130. In more detail, an opening 121 in which the punch 130 is disposed may be formed in the stripper 120. The opening 121 may be formed to pass through from a bottom surface to a top surface of the stripper 120 and may face the molding space 111 of the die 110 in a vertical direction with the pouch film 10 therebetween.

The punch 130 may have a shape corresponding to a shape of the cup part 11 to be molded in the pouch sheet 10. The punch 130 may be disposed in the opening 121 of the stripper 120. The punch 130 may descend into the molding space 111 in a state in which the pouch sheet 10 is fixed between the die 110 and the stripper 120 to press the pouch film 10 downward, thereby molding the cup part 11 in the pouch sheet 10.

However, the present invention is not limited thereto, and instead of the descending of the punch 130, the die 110 and the stripper 120 in the state in which the pouch sheet 10 is fixed may ascend. Even in this case, the punch 130 may be inserted into the molding space 111 to press the pouch film 10 downward, thereby molding the cup part 11 in the pouch sheet 10.

When the cup part 11 is molded, residual stress may occur in side regions disposed at both sides of the cup part 11 in the pouch sheet 10. In addition, due to the residual stress, curling may occur in the side regions. In addition, even if the curling does not occur directly in the side regions due to tension applied to the pouch sheet 10, the curling may occur in each pouch-type battery case formed by cutting the pouch sheet 10 in the future.

In addition, when the cup part 11 is molded, weight distribution of the pouch sheet 10 may be biased toward the central portion in the width direction, and both the sides of the pouch sheet 10 may be pushed inward in the width direction due to imbalance in the weight distribution.

A rotation shaft 210 of the first roller 200 and a rotation shaft 310 of the second roller 300 may extend in parallel with the width direction of the pouch sheet 10. Thus, the first roller 200 and the second roller 300 may rotate according to the movement of the pouch sheet 10.

The first roller 200 may rotate in contact with one surface (e.g., top surface) of the pouch sheet 10, and the second roller 300 may rotate in contact with the other surface (e.g., opposite to the one surface) of the pouch sheet 10.

Each of the first roller 200 and the second roller 300 may be provided as a pair that are spaced apart from each other in the width direction of the pouch sheet 10. In more detail, the pair of first rollers 200 may rotate in contact with both sides of one surface of the pouch sheet 10 in the width direction, and the pair of second rollers 300 may rotate in contact with both sides of the other surface of the pouch sheet 10 in the width direction. Since the cup part 11 is recessed downward from the pouch sheet 10, the cup part 11 may pass between the pair of second rollers 300 according to the movement of the pouch sheet 10.

With respect to the moving direction of the pouch sheet 10, a distance L1 between the rotation shaft 210 of the first roller 200 and the forming device 100 may be different from a distance L2 between the forming device 100 and the rotation shaft 310 of the second roller 300. For example, with respect to the forming device 100, the distance L1 up to the rotation shaft 210 of the first roller 200 is greater than the distance L2 to the rotation shaft 310 of the second roller 300.

The first roller 200 and the second roller 300 may prevent the curling from occurring and prevent both the sides of the pouch sheet 10 from being pushed inward in the width direction. Hereinafter, the first roller 200 and the second roller 300 will be described in more detail.

Figure 3:
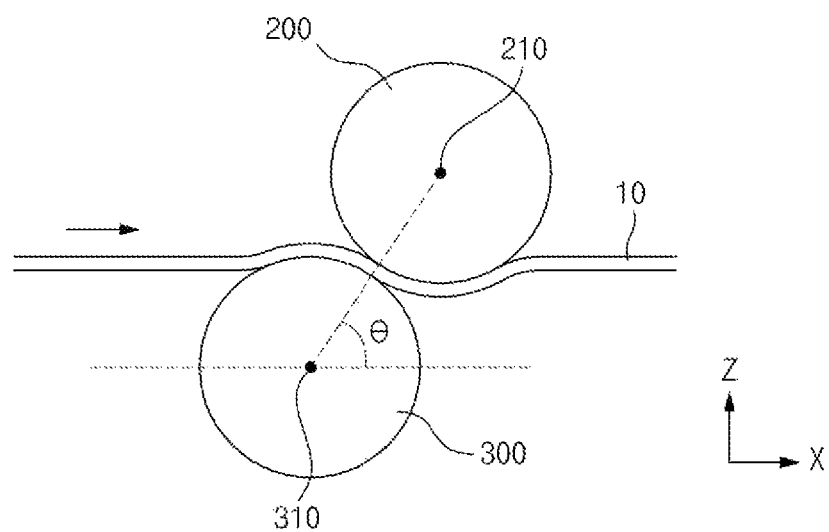
FIG. 3 is a side view illustrating a first roller and a second roller according to an embodiment of the present invention.
Figure 4:
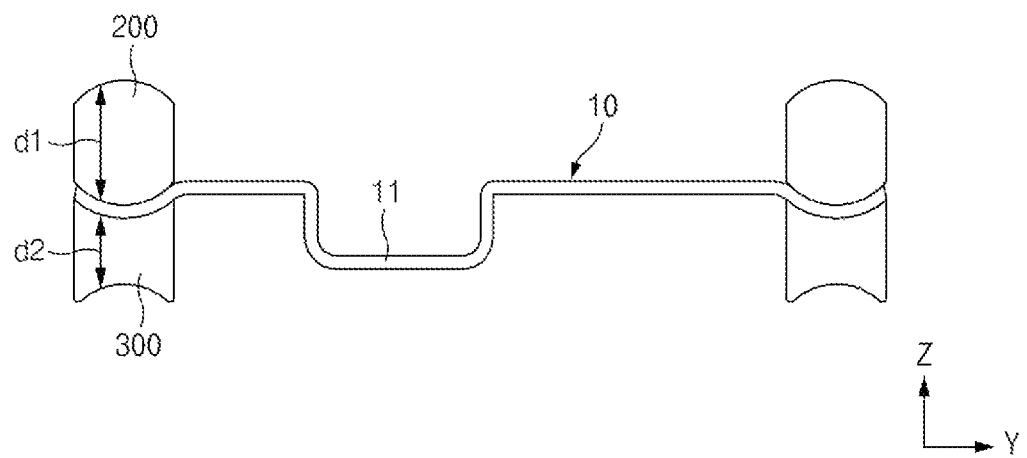
FIG. 4 is a front view illustrating the first roller and the second roller according to an embodiment of the present invention.
Figure 5:
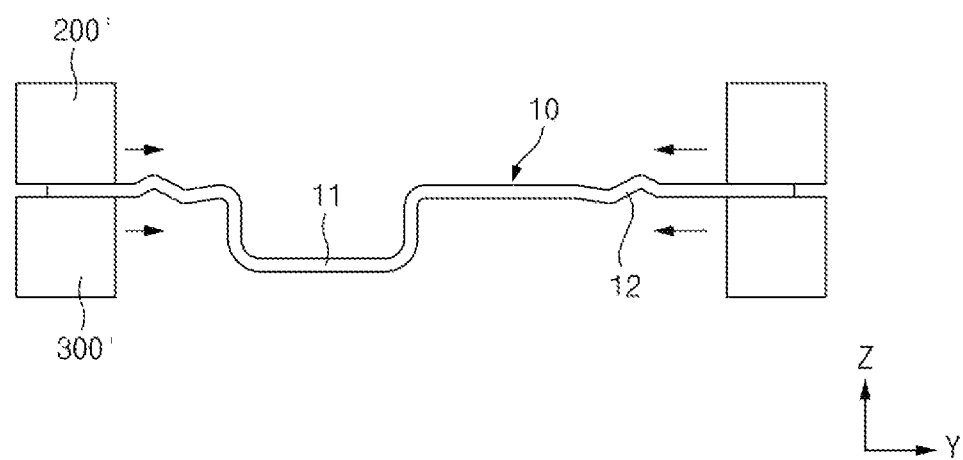
FIG. 5 is a front side view illustrating a first roller and a second roller according to a comparative example.

FIG. 3 is a side view illustrating the first roller and the second roller according to an embodiment of the present invention, FIG. 4 is a front view illustrating the first roller and the second roller according to an embodiment of the present invention, and FIG. 5 is a front side view illustrating a first roller and a second roller according to a comparative example.

The first roller 200 and the second roller 300 may be in contact with both the sides of the pouch sheet 10 in the width direction to apply a pressure, thereby removing the residual stress of the pouch sheet 10. The first roller 200 and the second roller 300 may be disposed to face each other with the pouch sheet 10 therebetween.

Thus, the side regions disposed at both the sides of the cup part 11 in the pouch sheet 10 may pass between the first roller 200 and the second roller 300, and thus, the residual stress may be removed.

The first roller 200 and the second roller 300 may be arranged to form a predetermined inclined angle θ with respect to the moving direction of the pouch sheet 10. That is, the first roller 200 and the second roller 300 may be disposed to face each other in a predetermined inclined direction rather than a vertical direction.

The inclined angle θ may be an angle formed by a virtual plane passing through the rotation shaft 210 of the first roller 200 and the rotation shaft 310 of the second roller 300 and a virtual plane parallel to the moving direction of the pouch film 10. According to the inclined angle θ, strength at which the first roller 200 and the second roller 300 press the pouch sheet 10 may be determined. Therefore, the inclined angle θ formed between the first roller 200 and the second roller 300 may be properly maintained to effectively remove the residual stress at both the sides of the pouch sheet 10 in the width direction, thereby preventing the curling from occurring.

In addition, any one of the first roller 200 and the second roller 300 may have an outer diameter that gradually decreases inward in the thickness direction, and the other of the first roller 200 and the second roller 300 may have an outer diameter that gradually increases inward in the thickness direction.

That is, any one of the first roller 200 and the second roller 300 may have a concave portion formed along an outer circumference thereof, and any one of the first roller 200 and the second roller 300 may have a convex portion along an outer circumference thereof.

For example, as illustrated in FIG. 4, the first roller 200 may have an outer diameter d1 that gradually increases inward in the thickness direction, and the second roller 300 may have an outer diameter d2 that gradually increases inward in the thickness direction. A person skilled in the art will readily understand the reverse case as well.

The outer circumference of the first roller 200 and the outer circumference of the second roller 300 may have shapes corresponding to each other. That is, rates of change of the outer diameter in the thickness direction of the first roller 200 and the second roller 300 may be the same or similar to each other. Thus, both the sides of the pouch sheet 10 in the width direction may be in close contact with each of the first roller 200 and the second roller 300.

In comparison, FIG. 5 illustrates a comparative example in which each of a first roller 200 and a second roller 300' is provided as a flat roller having a constant outer diameter. In this case, both sides of the pouch sheet 10 may be pushed inward in the width direction due to imbalance in weight distribution of a pouch sheet 10 generated by a cup part 11. Thus, a portion of each of both the sides of the pouch sheet 10 may be separated between the first roller 200 and the second roller 300 to causes wrinkles 12 in the side regions disposed at both the sides of the cup part 11 in the pouch sheet 10.

On the other hand, the first roller 200 and the second roller 300 according to an embodiment of the present invention may prevent both the sides of the pouch sheet 10 from being pushed inward in the width direction, thereby preventing the wrinkles from occurring in the pouch sheet 10.

Figure 6:
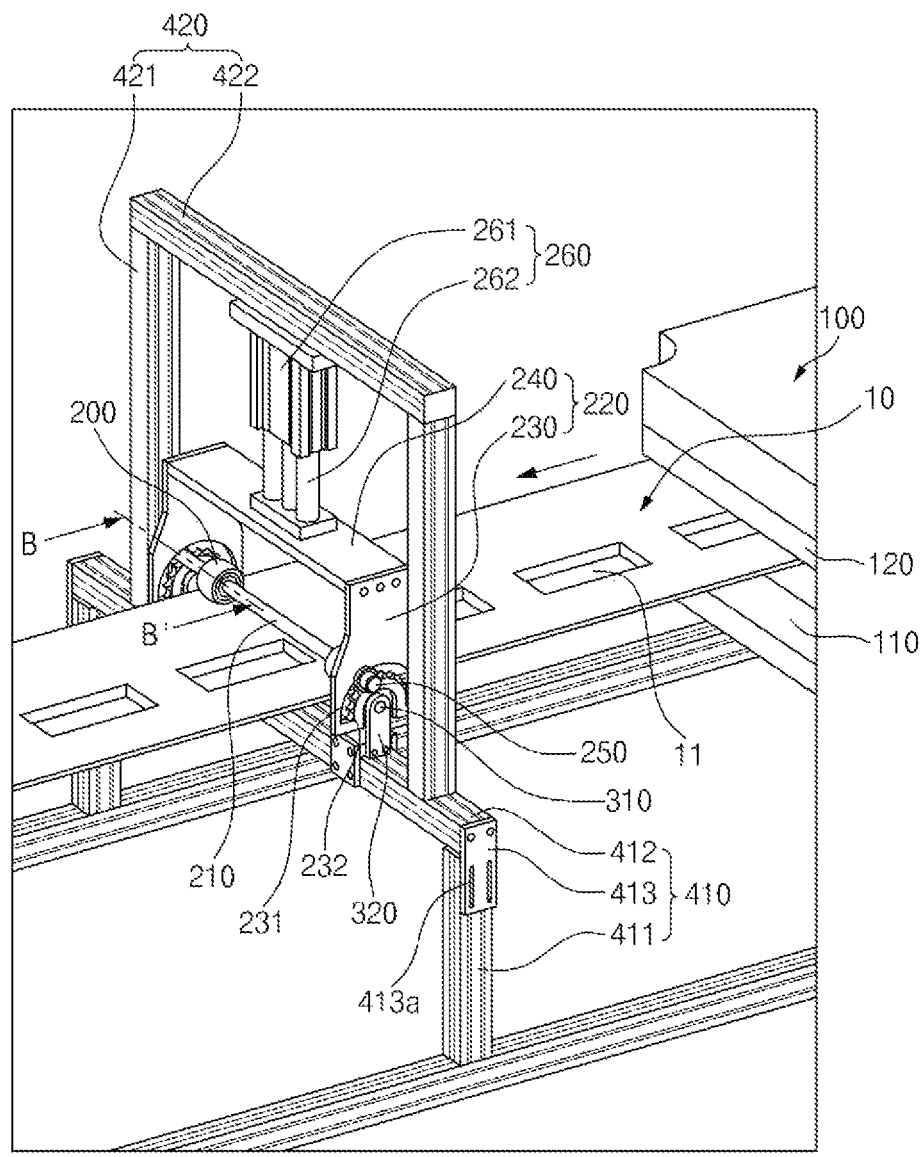
FIG. 6 is a perspective view illustrating an apparatus for manufacturing a pouch-type battery case according to another embodiment of the present invention.
Figure 7:
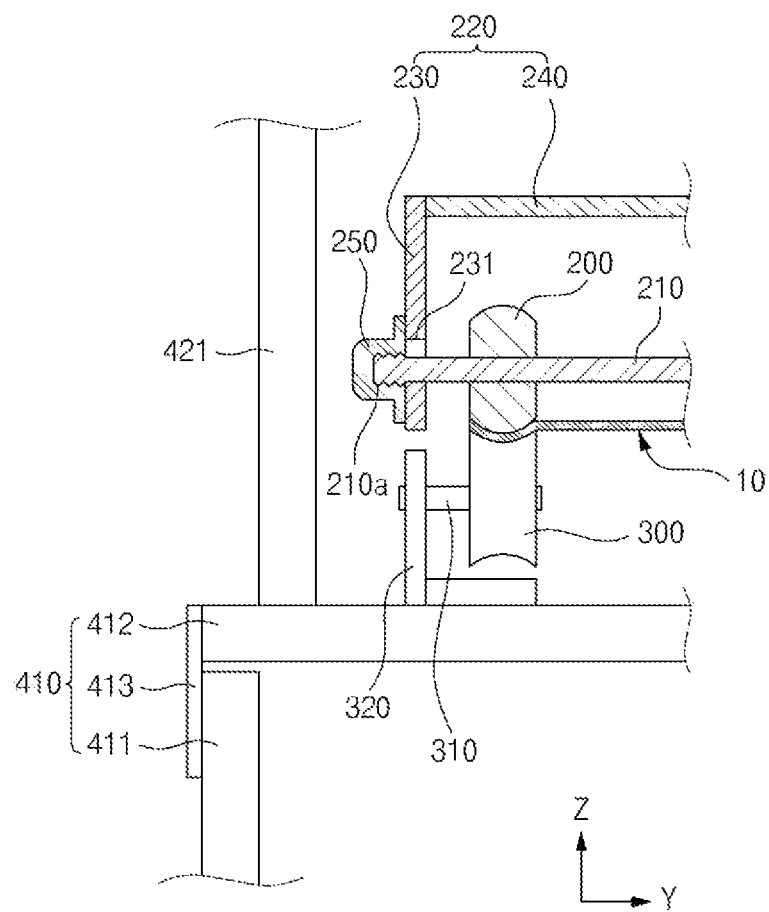
FIG. 7 is a sectional view taken along the line B-B' of FIG. 6.

FIG. 6 is a perspective view illustrating an apparatus for manufacturing a pouch-type battery case according to another embodiment of the present invention, and FIG. 7 is a sectional view taken along the line B-B' of FIG. 6.

Hereinafter, contents duplicated with the previously described contents will be cited, and described with a focus on the differences.

In an apparatus for manufacturing a pouch-type battery case (hereinafter, 'manufacturing apparatus') according to this embodiment, strength of a first roller 200 and a second roller 300, which press both sides of a pouch sheet 10 in a width direction, may be easily adjusted.

In more detail, the manufacturing apparatus may include a shaft 210 connecting a pair of first rollers 200 to each other and an angle adjustment frame 220 having a guide hole 231 through which each of both ends of the shaft 210 passes. The manufacturing apparatus may further include an elevation mechanism 260 elevating the angle adjustment frame 220.

Since the shaft 210 functions as the rotation shaft 210 (see FIG. 3) of the roller 200 in one embodiment, the rotation shaft in another embodiment will be denoted by the same reference numeral '210'.

The shaft 210 may be spaced apart from an upper side of the pouch sheet 10, extend in parallel with the width direction of the pouch sheet 10, and connect the pair of first rollers 200 to each other.

Both the ends of the shaft 210 may further protrude outward than the pair of first rollers 200 to pass through the guide hole 231 of the angle adjustment frame 220.

The angle adjustment frame 220 may include a pair of side plates 230 disposed at both sides of the pouch sheet 10 in the width direction and a connection frame 240 connecting the pair of side plates 230 to each other at an upper side of the pouch sheet 10.

The connection frame 240 may connect upper ends of the pair of side plates 230 to each other. Thus, with respect to the pouch sheet 10, the connection frame 240 may be disposed higher than the shaft 210.

The connection frame 240 may be horizontally disposed and have a plate shape extending parallel to the width direction of the pouch sheet 10.

The pair of side plates 230 may be vertically disposed to face each other in the width direction of the pouch sheet 10. The guide hole 231 through which an end of the shaft 210 passes may be formed in each of the side plates 230.

The guide hole 231 may have an arc shape. In more detail, the guide hole 231 may have an arc shape that is convexly curved upward. In addition, the arc-shaped curvature center formed by the guide groove 231 may be disposed on a rotation shaft 310 of the second roller 300. Thus, when the position of the shaft 210 varies along the guide hole 231, an inclined angle θ (see FIG. 3) formed between the first roller 200 and the second roller 300 may vary.

A plurality of restriction grooves 232 that restrict the shaft 210 in a longitudinal direction of the guide hole 231 may be formed in an inner circumference of the guide hole 231. In more detail, the plurality of restriction grooves 232 may be formed on an inner circumference of a lower portion of the guide hole 231. Each of the restriction grooves 232 may have a size and shape in which the shaft 210 is capable of being seated.

The plurality of restriction grooves 232 may be formed at each predetermined angle (e.g., about 15 degrees) with respect to the arc shape of the guide hole 231. As the angle decreases, the inclined angle θ formed between the first roller 200 and the second roller 300 may be more precisely adjusted.

Since the position of the shaft 210 does not arbitrarily vary along the guide hole 231 by the restriction groove 232, the inclined angle θ formed between the first roller 200 and the second roller 300 may be stably maintained.

A coupling part 210a to which a fixing member 250 such as a knob cap is capable of being coupled may be formed at each of both the ends of the shaft 210. The fixing member 250 may be coupled to the coupling part 210a from the outside of the side plate 230. The fixing member 250 may prevent the shaft 210 from being separated from the restriction groove 232 due to vibration or the like.

For example, the coupling part 210a may be a male screw thread, and a female screw thread that is capable of being coupled to the male screw thread on an inner circumference of a knob cap that is the fixing member 250. However, the configurations of the fixing member 250 and the coupling portion 210a are not limited thereto.

An operator may separate the fixing member 250 from the coupling part 210a of the shaft 210 and seat the shaft 210 in another restriction groove 232, and thus, the inclined angle θ between the first roller 200 and the second roller 300 may be easily adjusted. Thereafter, the operator may couple the fixing member 250 to the coupling portion 210a of the shaft 210 so that the shaft 210 is not separated from the changed restriction groove 232.

The elevation mechanism 260 may adjust a height of the angle adjustment frame 220. Since both the ends of the shaft 210 connecting the pair of first rollers 200 are fixed in the state of passing through the guide holes 231 formed in the angle adjustment frame 220, the shaft 210 and the pair of first rollers 200 may be elevated together with the angle adjustment frame 220.

When the first roller 200 ascends, the strength of pressing the pouch sheet 10 may decrease, and when the first roller 200 descends, the strength of pressing the pouch sheet 10 may increase. Thus, the height of the first roller 200 may be appropriately adjusted by the elevating mechanism 260 to effectively remove the residual stress at both the sides of the pouch sheet 10 in the width direction, thereby preventing curling from occurring.

In addition, the elevation mechanism 260 is electronically controllable. Thus, there is an advantage that the height of the first roller 200 is capable of being adjusted quickly and immediately.

The elevation mechanism 260 may be coupled from an upper side of the angle adjustment frame 220, more specifically, the connection frame 230, and the angle adjustment frame 220 may be supported by being hung on the elevation mechanism 260. That is, the elevation mechanism 260 may support the angle adjustment frame 220 at the upper side.

For example, the elevation mechanism 260 may include a cylinder actuator 261 coupled to a second support frame 420 to be described later and at least one driving bar 262 that is elevated by the cylinder actuator 261. The driving bar 262 may extend vertically, and a lower end of the driving bar 262 may be coupled at the upper side of the connection frame 230. In addition, in order to stably elevate the angle adjustment frame 220 without shaking, a plurality of driving bars 262 may be arranged in the width direction of the pouch sheet 10.

However, the configuration of the elevation mechanism 260 is not limited thereto and may be changed as necessary.

The manufacturing apparatus may further include a first support frame 410 supporting the second roller 300 and a second support frame 420 supporting the first roller 200.

The first support frame 410 may have an approximately 'C' shape. In more detail, the first support frame 410 may include a pair of first vertical frames 411 spaced apart from each other in the width direction of the pouch sheet 10 and a first horizontal frame 412 supported by the pair of first vertical frames 411.

The first horizontal frame 412 may be disposed below the pouch sheet 10 to extend in parallel with the width direction of the pouch sheet 10.

A roller support 320 on which the rotation shaft 310 of the second roller 300 is rotatably supported may be coupled to the first horizontal frame 412. That is, the second roller 300 may be supported by the first horizontal frame 412.

The roller support 320 may be disposed below the angle adjusting frame 220 described above, in more detail, the side plate 230.

The first support frame 410 may include a height adjustment part 413 capable of adjusting a height of the first horizontal frame 412 with respect to the first vertical frame 411. As described above, since the second roller 300 is supported by the first horizontal frame 412, a height of the second roller 300 may be easily adjusted by the height adjustment part 413.

Thus, an operator may appropriately set the height of the second roller 300 according to a height of the pouch sheet 10 by using the height adjustment part 413.

For example, the height adjustment part 413 may be a connection plate that connects an end of the first horizontal frame 412 to the first vertical frame 411 and has a long hole 413a elongated in a vertical direction. The long hole 413a may face an outer surface of the first vertical frame 411, and a coupling member (not shown) such as a guide bolt may pass through the long hole 413a and be coupled to the first vertical frame 411. Thus, the height of the first horizontal frame 412 with respect to the first vertical frame 411 may be determined according to a position at which the coupling member passes through the long hole 413a.

The second support frame 420 may have an approximately 'C' shape. In more detail, the second support frame 420 may include a pair of second vertical frames 421 spaced apart from each other in the width direction of the pouch sheet 10 and a second horizontal frame 422 supported by the pair of second vertical frames 421.

The second support frame 420 may be supported by the first support frame 410, more specifically, the first horizontal frame 412. In more detail, a lower end of the second vertical frame 421 may be coupled at an upper side of the first horizontal frame 412. In this case, the portion, to which the lower end of the second vertical frame 421 is coupled, in the first horizontal frame 412 may be outside the portion to which the roller support 320 is coupled.

The pair of second vertical frames 421 may be disposed at both sides of an angle adjustment frame 220 with respect to the width direction of the pouch sheet 10.

The second horizontal frame 422 may extend in parallel with the width direction of the pouch sheet 10, connect upper ends of the second vertical frames 421 to each other, and be disposed above the angle adjustment frame 220. In addition, the elevation mechanism 260 may be hung and supported on the second horizontal frame 422. In addition, the first roller 200 may be supported by the second horizontal frame 422.

Due to the configuration of the manufacturing apparatus, the strength of the first roller 200 and the second roller 300 pressing both the sides of the pouch sheet 10 in the width direction may be easily adjusted, and the first roller 200 and the second roller 300 may be stably rolled.

The above-disclosed subject matter is to be considered illustrative, and not restrictive, and the appended claims are intended to cover all such modifications, enhancements, and other embodiments, which fall within the true spirit and scope of the present disclosure.

Thus, the embodiment of the present invention is to be considered illustrative, and not restrictive, and the technical spirit of the present invention is not limited to the foregoing embodiment.

According to the embodiment of the present invention, any one of the first roller and the second roller may have the outer diameter that gradually decreases inward in the thickness direction, and the other one may have the outer diameter that gradually increases inward in the thickness direction. Thus, even if the weight distribution of the pouch sheet is biased toward the central portion in the width direction due to the cup part, both the sides of the pouch sheet may be prevented from being pushed inward in the width direction.

In addition, since the first roller and the second roller are arranged to form the predetermined inclined angle with respect to the moving direction of the pouch sheet, both the sides of the pouch sheet, in which the cup part is molded, in the width direction may pass between the first roller and the second roller to reduce the residual stress. Thus, the curling may be prevented from occurring in the pouch sheet or the pouch-type case, in which the pouch sheet is cut.

In addition, the inclined angle may be easily adjusted by the angle adjustment frame, and the height of the angle adjustment frame may be adjusted by the elevation mechanism. Therefore, the strength of the first roller and the second roller pressing both the sides of the pouch sheet in the width direction may be easily adjusted.

In addition, the effects that are obvious to those skilled in the art may be predicted from the configurations according to the embodiment of the present invention.

Therefore, the scope of the present disclosure is defined not by the detailed description of the invention but by the appended claims, and all differences within the scope will be construed as being included in the present disclosure.

DESCRIPTION OF THE REFERENCE NUMERALS

10: pouch sheet
11: cup part
100: forming device
200: first roller
210; rotation shaft
220: angle adjustment frame
230: side plate
231: guide hole
232: restriction groove
240: connection frame
250: fixing member
260: elevation mechanism
261: cylinder actuator
262: driving bar
300: second roller
320: roller support
410: first support frame
411: first vertical frame
412: first horizontal frame
413: height adjustment part
420; second support frame
421: second vertical frame
422: second horizontal frame

What is claimed is:

1. An apparatus for manufacturing a pouch-type battery case, which is configured to mold a pouch sheet, the apparatus comprising:
a forming device configured to mold a cup part in the pouch sheet;
a first roller disposed behind the forming device in a moving direction of the pouch sheet and configured to rotate in contact with a first surface of the pouch sheet; and
a second roller disposed to face the first roller with the pouch sheet therebetween and configured to rotate in contact with a second surface opposite to the first surface of the pouch sheet,
wherein any one of the first roller and the second roller has an outer diameter that gradually decreases inward in a thickness direction, and
the other one of the first roller and the second roller has an outer diameter that gradually increases inward in the thickness direction.

2. The apparatus of claim 1, wherein the first roller is provided in a pair that are configured to rotate in contact with both sides of the first surface of the pouch sheet in a width direction, wherein the width direction is perpendicular to the moving direction.

3. The apparatus of claim 1, wherein the second roller is provided in a pair that is configured to rotate in contact with both sides of the second surface of the pouch sheet in a width direction, wherein the width direction is perpendicular to the moving direction.

4. The apparatus of claim 1, wherein a distance between the forming device and a rotation shaft of the first roller is different from a distance between the forming device and a rotation shaft of the second roller in the moving direction of the pouch sheet.

5. The apparatus of claim 1, wherein an outer circumference of the first roller and an outer circumference of the second roller have outer profiles shaped to conform to one another.

6. The apparatus of claim 1, wherein the first roller and the second roller are disposed at a predetermined angle therebetween in the moving direction of the pouch sheet.

7. The apparatus of claim 1, further comprising:
a shaft extending in parallel to a width direction of the pouch sheet and configured to connect a pair of the first rollers to each other; and
an angle adjustment frame disposed outside the pair of first rollers in the width direction of the pouch sheet and having a guide hole through which each of both ends of the shaft is configured to pass,
wherein the guide hole has an arc shape having a center of curvature disposed on a rotation shaft of the second roller.

8. The apparatus of claim 7, wherein a plurality of restriction grooves are formed in an inner circumference of the guide hole, the plurality of restriction grooves being disposed at each predetermined angle to restrict an end of the shaft in a longitudinal direction of the guide hole.

9. The apparatus of claim 8, wherein a coupling part is formed on each of both ends of the shaft, and wherein a fixing member configured to prevent the shaft from being separated from each of the restriction grooves is capable of being coupled to each of the coupling parts.

10. The apparatus of claim 7, further comprising an elevation mechanism configured to support the angle adjustment frame at an upper side of the angle adjustment frame, the elevation mechanism being configured to elevate the angle adjustment frame.

11. The apparatus of claim 10, wherein the angle adjustment frame comprises:
a pair of side plates, each of which has the guide hole; and
a connection frame which is spaced upward from the pouch sheet and configured to connect the pair of side plates to each other, the elevation mechanism being coupled to the connection frame.

12. The apparatus of claim 10, further comprising:
a first support frame configured to support a pair of the second rollers; and
a second support frame to which the elevation mechanism is coupled.

13. The apparatus of claim 12, wherein the second support frame is supported by the first support frame.

14. The apparatus of claim 12, wherein the first support frame comprises:
a pair of first vertical frames spaced in the width direction of the pouch sheet; and
a first horizontal frame supported by the pair of first vertical frames and configured to support the pair of second rollers.

15. The apparatus of claim 14, wherein a height adjustment part is provided on the first support frame, the height adjustment part being configured to adjust a height of the first horizontal frame with respect to the first vertical frames.

16. The apparatus of claim 12, wherein the second support frame comprises:
a pair of second vertical frames disposed outside the angle adjustment frame in the width direction of the pouch sheet; and
a second horizontal frame which is supported by the pair of second vertical frames and on which the elevation mechanism is hung and supported.

* * * * *